Figure 4:
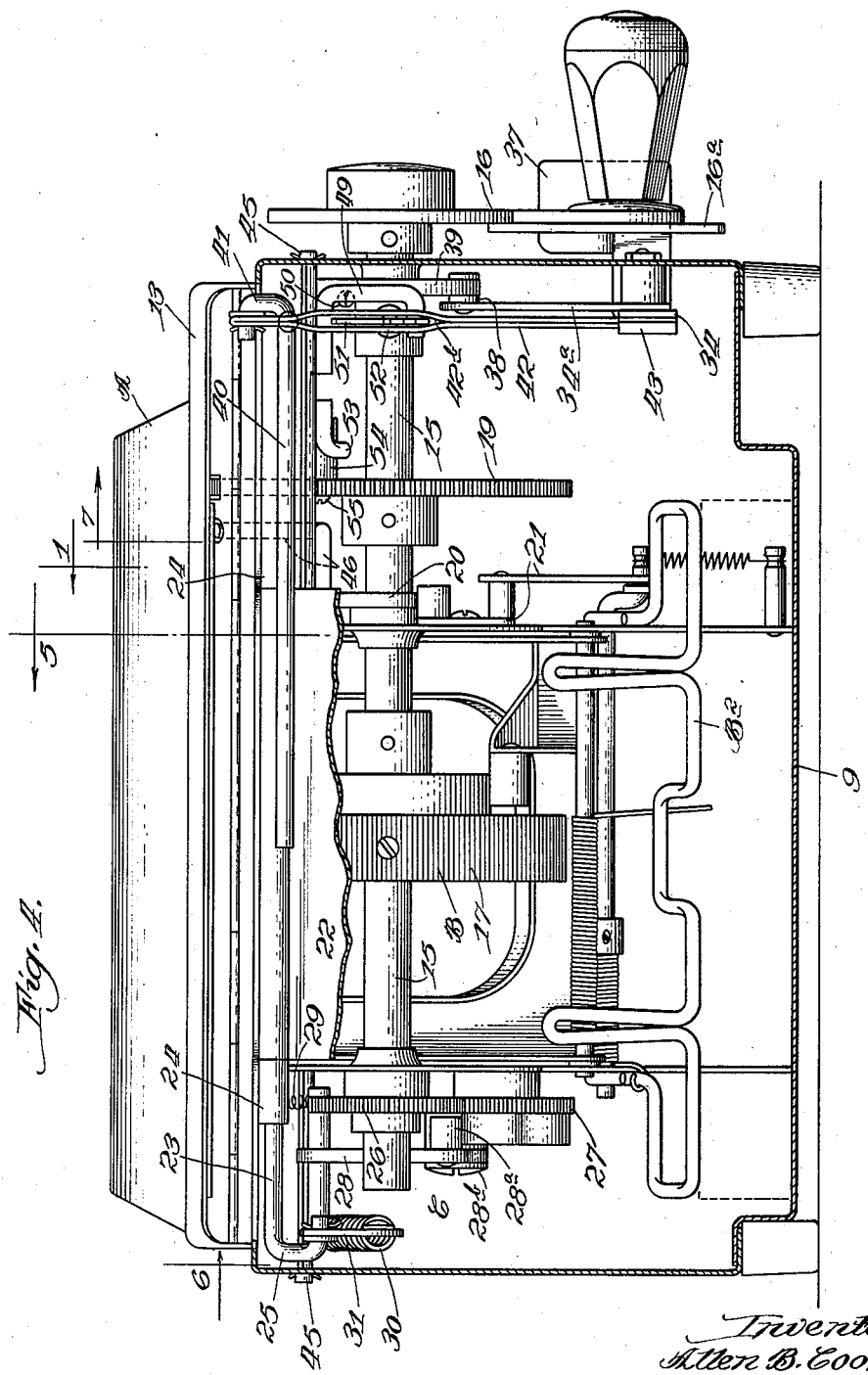

Jan. 25, 1938.  A. B. COOKE  2,106,520
REFOLDING MECHANISM FOR DUPLICATING MACHINES
Filed April 26, 1937    4 Sheets-Sheet 1
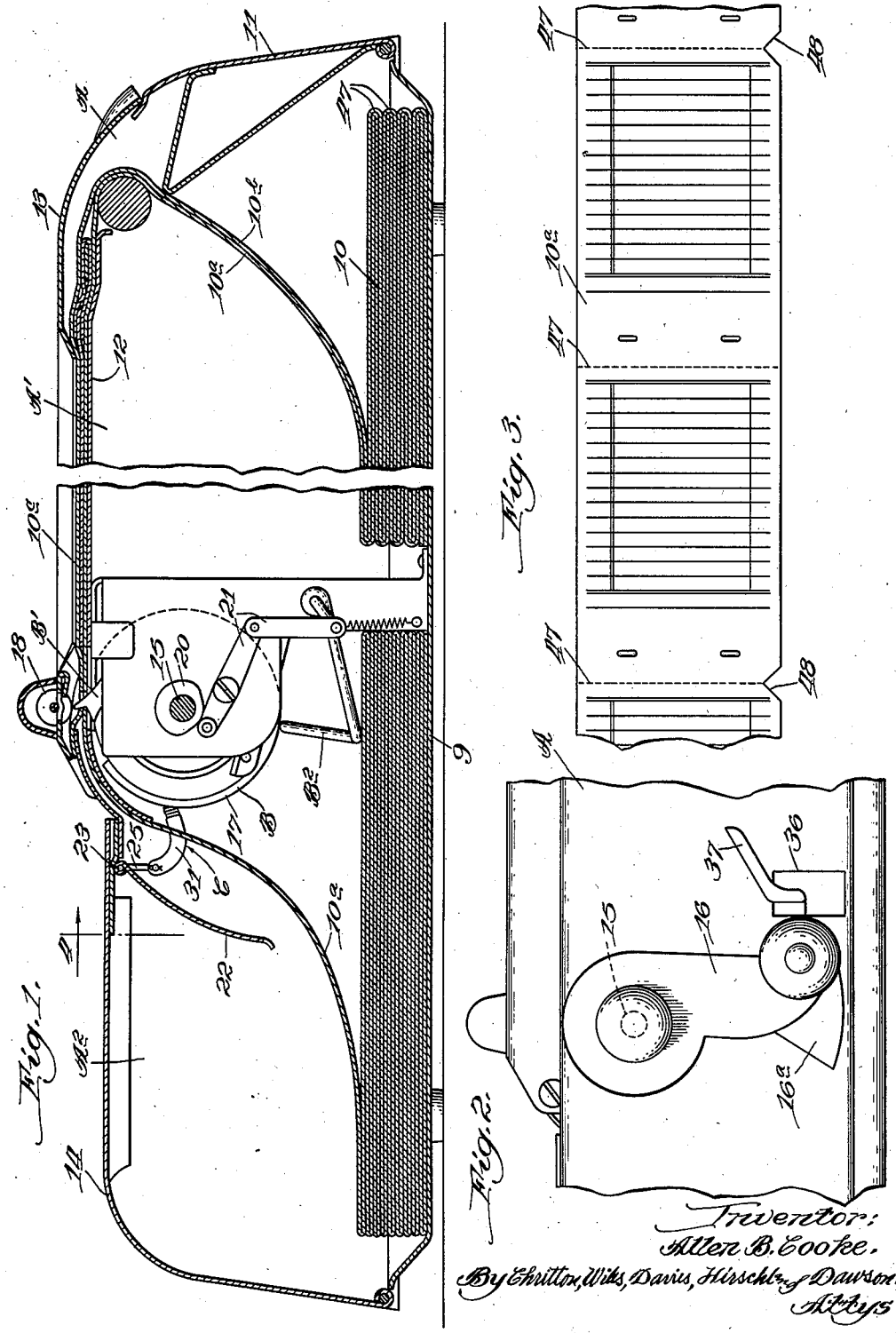

Jan. 25, 1938.  A. B. COOKE  2,106,520
REFOLDING MECHANISM FOR DUPLICATING MACHINES
Filed April 26, 1937  4 Sheets-Sheet 2

Inventor:
Allen B. Cooke.
By Chritton, Wiles, Davis, Hirsch & Dawson,
Attys.

Jan. 25, 1938. A. B. COOKE 2,106,520
REFOLDING MECHANISM FOR DUPLICATING MACHINES
Filed April 26, 1937 4 Sheets-Sheet 3

Inventor:
Allen B. Cooke.
By Chritton, Wiles, Davis, Hirsch & Dawson
Attys.

Jan. 25, 1938. A. B. COOKE 2,106,520
REFOLDING MECHANISM FOR DUPLICATING MACHINES
Filed April 26, 1937 4 Sheets-Sheet 4

Inventor:
Allen B. Cooke.
By Chritton, Wiles, Davies, Hirschl & Dawson.
Attys.

Patented Jan. 25, 1938

2,106,520

UNITED STATES PATENT OFFICE 2,106,520

REFOLDING MECHANISM FOR DUPLICATING MACHINES

Allen B. Cooke, Danville, Ill., assignor to United Autographic Register Co., a corporation of Illinois Application April 26, 1937, Serial No. 139,095

16 Claims. (Cl. 282—16)

This invention relates to mechanism for guiding the refolding of a stationery strip into a zig-zag folded packet, and more particularly to detector mechanism for controlling the operation of the mechanism by perforations or cut-outs provided in the stationery, so that the strip will be refolded with the folds in the same direction taken by the strip in its original supply packet.

The primary object of the present invention is to provide a movable refolding guide plate in the record compartment of an autographic register which is driven by the feed mechanism of the register but its operation is controlled by the stationery fed into the record compartment. The stationery is provided with perforations disposed with respect to alternate lines of folding so that the detector mechanism, which controls the guide mechanism, will automatically conform the position of the guide to the original directions of fold in the strip.

Heretofore it has been common practice to draw a strip of stationery from a supply packet, provided in the supply compartment of a register, over the platen to the record compartment and refold the strip into a zig-zag record packet. It has been the practice to provide a movable guide plate which alternately directs the stationery to the front and rear of the record compartment, and if the guide plate movement is properly timed with respect to the original folds in the stationery, it has been found that it will refold properly. However, if the guide plate is not properly timed, the record strip will be given reverse folds and in a short time the stationery will be bunched up into a wrinkled mass. In order to overcome this, indicating mechanism has been provided in some of the machines to show the proper timing with respect to the stationery. However, in the present invention, no attention need be paid to the loading as the machine will automatically conform itself to the control of the stationery.

No invention is claimed in the present application to the register casing of feed mechanism per se or the packet-compressing device in the record compartment.

The invention is illustrated in the preferred embodiment in the accompanying drawings, in which—

Figure 5:
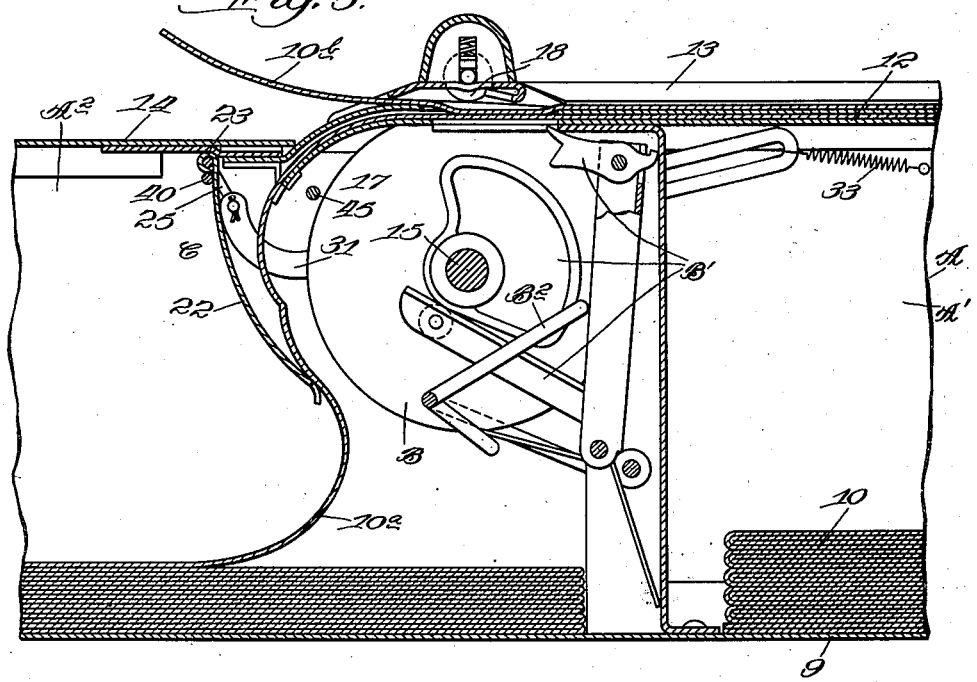
Figure 6:
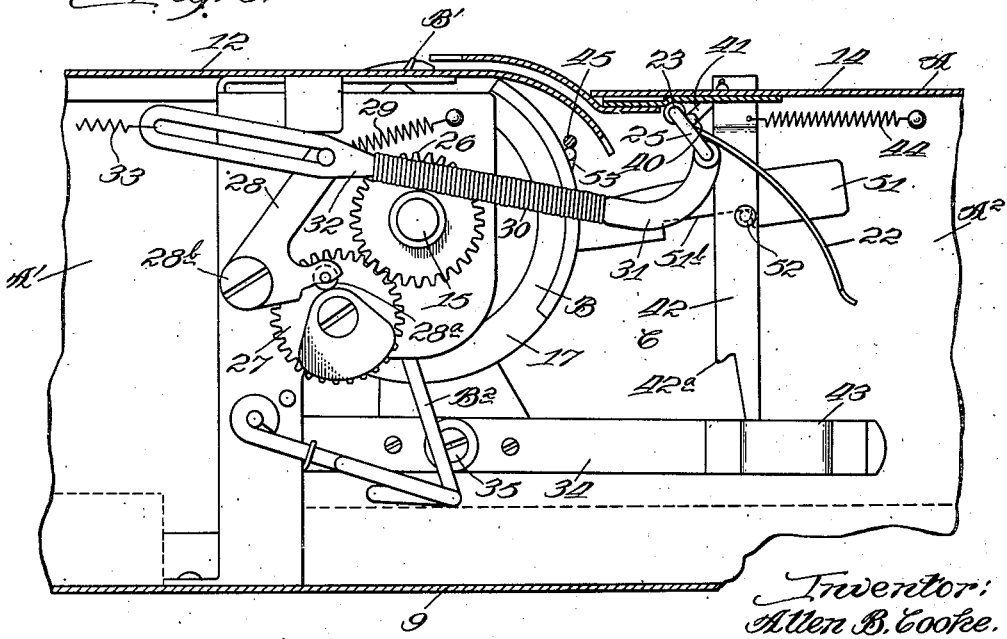
Figure 7:
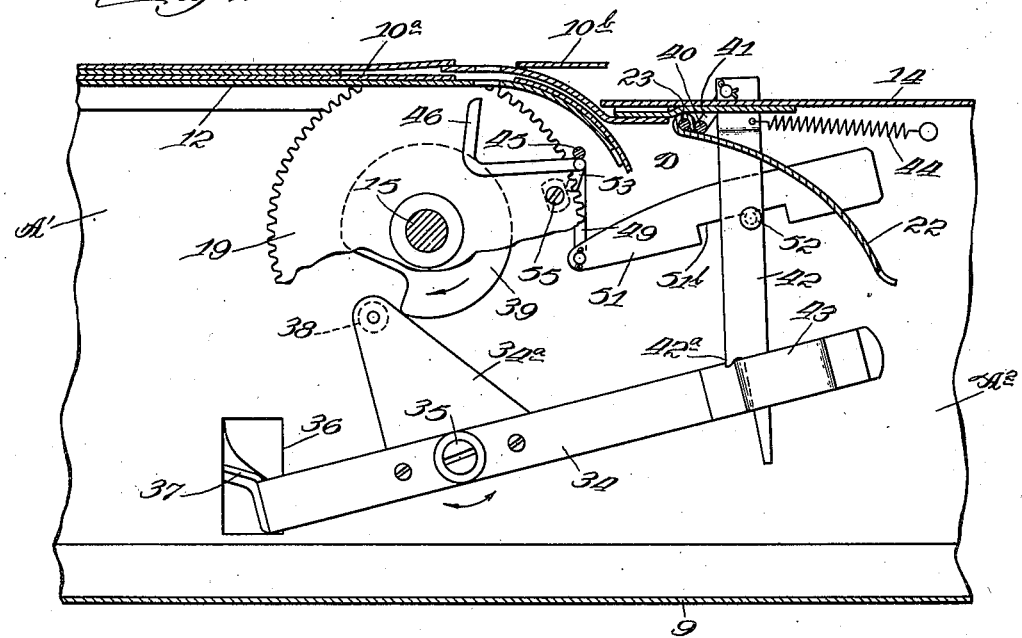

Fig. 1 is a broken longitudinal sectional view of a machine embodying the invention taken as indicated at line 1 of Fig. 4; Fig. 2, a broken side elevational view showing the crank, cam and stop device for the crank; Fig. 3, a broken plan view of a strip of forms provided at alternate lines of weakening with marginal perforations or cut-out portions; Fig. 4, a broken transverse sectional view taken as indicated at line 4 of Fig. 1; Fig. 5, a broken sectional view taken as indicated at line 5 of Fig. 4; Fig. 6, a broken sectional view taken as indicated at line 6 of Fig. 4; Fig. 7, a broken sectional view taken as indicated at line 7 of Fig. 4, showing the guide plate locked against substantial movement; and Fig. 8, a view similar to Fig. 7, showing the stop mechanism in position when the crank is locked (as shown in Fig. 2) and the dotted lines showing how the rock arm fails to engage the latching dog when the detector finger is held depressed by the stationery.

In the embodiment illustrated, A designates a register casing provided with a supply compartment A′ and a record compartment A²; B, feed mechanism provided with a stationery aligning device B′ and a record packet-compressing device B²; C, guide mechanism, driven by the feed mechanism B and movable to direct refolding of the record strip; and D, detector mechanism, controlled by the stationery, adapted to lock the guide mechanism C against substantial movement.

As stated above, no invention is claimed herein in the casing or feed mechanism per se. The supply compartment A′ is provided with a bottom wall 9, on which a supply packet of stationery 10 may be placed through an end door 11. The compartment is provided with a platen, forming top closure 12, over which a record strip 10ª and a top strip 10ᵇ may be led to the feed mechanism B. The stationery strips are interleaved with carbon 10ᶜ and are accessible for writing through an opening provided in a skeleton cover 13.

The record compartment A² is disposed in rear of the feed mechanism, and the record packet may be removed by raising the top closure 14.

The feed mechanism B is carried on a drive shaft 15, journalled in the casing A, and is provided on the outside of the casing with a hand crank 16. Briefly, a mutilated lower feed wheel 17 coacts with an upper presser roll 18, which is driven from the shaft 15 by means of a gear 19. The feed wheel 17 is adapted to feed slightly less than one form length of stationery on each revolution of the shaft 15 and the feed of a form length is completed and alignment accomplished by means of jogging fingers provided on the aligning device B′, as well understood in the art. As best shown in Fig. 1, a packet-pressing device B² is pivotally mounted in the record compartment and is raised and lowered during each revolution of the shaft 15 by means of a cam 20 coacting with a linkage 21.

The guiding mechanism, which is adapted to direct the stationery alternately to the front or rear of the record compartment, comprises a concavo convex guide plate 22 which is pivotally mounted on a shaft 23 supported in journals 24 in the top of the register. As best shown in Figs. 4 and 6, the left end of the shaft 23 (as viewed in Fig. 4) is bent to form a crank 25. As shown in Fig. 6, the shaft 15 is provided with a gear 26 which meshes with a cam gear 27 of similar size. A rock member 28 has a roller 28ª which is held in engagement with the cam on gear 27 by means of a tension spring 29. The rock member 28 is pivotally mounted on the frame of the feed mechanism by means of a machine screw 28ᵇ. The crank member 28 makes a lost motion connection with the crank 25 by means of a link comprising a stiff coil spring 30 provided at its rear end with a rigidly connected curved arm 31, which is journalled on the end of the crank 25, and at its front end with a rigidly connected slotted arm 32 which is urged forwardly by means of a tension spring 33. Thus, it will be understood that when the cam on gear 27 urges the rock member 28 forwardly the spring 33 will be permitted to draw the guide plate 22 forwardly to the position shown in Fig. 5. On the other hand, if the guide plate 22 is locked in the position shown in Fig. 6, the spring 33 will not be able to move it when the rock member 28 travels rearwardly in the slotted member 32.

Figure 8:
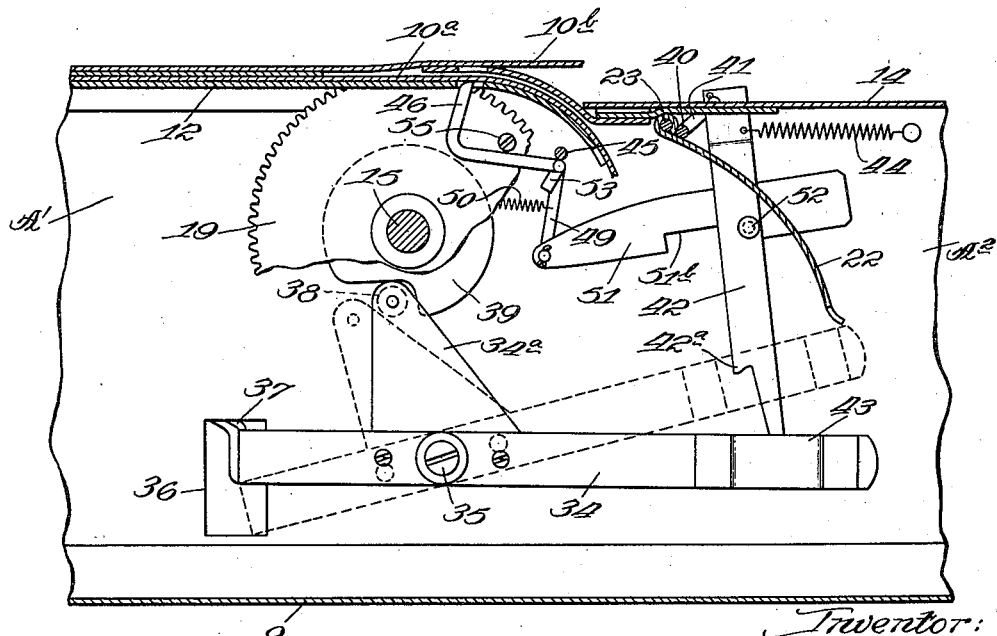

The locking mechanism for the crank 16 is best shown in Figs. 2, 7, and 8 and comprises a rock member 34 which is pivotally mounted on the inside of the casing A by a machine screw 35. The front end of the rock member projects out through a slot 36 in the casing into the path of the arm 16, and is provided with an upwardly and forwardly extending cam surface 37, which is adapted to coact with a cam face 16ª, provided on the hand crank, and hold the front end of the rock arm depressed during the first portion of the revolution of the shaft 15. As shown in Figs. 7 and 8, the rock member 34 is provided with extension 34ª which carries a roller 38 which is adapted to ride on a cam 39 provided on the shaft 15. Thus, it will be understood that to make a revolution of the shaft 15 it is first necessary to depress the member 37 and then it will be held depressed during the first portion of the revolution by the action of cam 16ª, and during most of the remainder of the revolution by cam 39 bearing against the roller 38.

As shown in Figs. 4 and 6–8, a locking shaft 40, provided at its end with a crank arm 41, is rigidly connected to the guide plate 22 and its shaft 23. A slotted latching dog 42 is pivotally mounted on the end of the crank 41 so as to swing downwardly with its lower end extending into an opening provided between the rear end of the rock member 34 and a bracket 43 rigidly mounted thereon. A small tension spring 44 urges the latching dog 42 rearwardly. Near the lower end of the latching dog is provided a shoulder and detent 42ª which is adapted to hook over the front end of the bracket 33. Thus, it will be understood by reference to Fig. 7 that if the latching dog is supported in its upper position by the rock member 34, the guide member 22 will not be free to swing forwardly under the influence of spring 33.

Whether the latching dog 42 is permitted to engage the rock member 34 is controlled by the detector mechanism D, which will now be described. A small rock shaft 45 is journalled in the casing and is provided with a rigidly connected forwardly and upwardly extending detector finger 46, which is adapted to project through openings provided in the platen 12 and thereby contact the advancing strips of stationery. As will be understood by reference to Fig. 3, each strip of stationery is provided with lines of weakening 47 between forms, and in the original packet the stationery is folded in one direction at the end of the first form and the next line of weakening is turned in the opposite direction at the next fold to make up a zig-zag packet. Alternate forms are provided with detector perforations or cut-out portions 48, which, in the embodiment shown in Fig. 3, are arranged at the line of weakening. The perforations are arranged so that when the stationery is drawn over the platen, the detector perforations will travel over the detector finger 46. As shown in Figs. 7 and 8, the shaft 45 is provided with a downwardly extending crank arm 49, which is urged forwardly by means of a spring 50. A latch member 51 is pivotally connected to the lower end of the crank 49 and extends rearwardly through a slot 42ᵇ provided in the latching dog 42 and has a notch 51ᵇ adapted to make a lost motion connection with a cross pin 52 in the latching dog. Thus, it will be understood that when a detector perforation in the stationery is in position over the finger 46, the spring 50 will draw the latching dog 42 forwardly so that when the member 37 is depressed by the operator the bracket 43 will be raised and become interlocked with the detent 42ª and prevent the guide-plate from being moved forwardly by the mechanism C. On the other hand, if the detector finger is held depressed, as indicated in Fig. 8, the spring 44 will be able to draw the latching dog rearwardly so that it will not become interlocked and the mechanism C will be free to operate. This position of the rock member 34 is indicated by dotted line in Fig. 8.

In order that the detector finger 46 will not remain projected through a detector perforation when feeding is resumed, the shaft 45 is provided with a small crank 53, see Figs. 4, 7, and 8. This arm, when the detector finger is in its upper position, projects into the path of a stud 54 held on the gear 19 by means of a screw 55. Thus, it will be understood that at the beginning of the feed the detector finger 46 will be withdrawn momentarily and then permitted to spring up into contact with the stationery until it again encounters a detector perforation.

The operation may be described briefly as follows: In loading the machine, the operator need pay no attention to the direction of folds of the stationery, but merely arranges the ends of the strips so that the strip 10ᵇ will be projected by the feed mechanism over the cover 14 and the strip 10ª will be directed into the record compartment A². If the detector finger 46 is held depressed by the stationery, the latching dog 42 will not be engaged by the rock member 34 when the member 37 is depressed to release the crank, and accordingly the guide mechanism will swing the plate 22 forwardly, as indicated in Fig. 5, and direct the advancing strip towards the front of the record compartment. At the completion of a revolution of the crank, it will be stopped by the member 37 and the cam 39. At the beginning of the next revolution of the crank, the detector finger will be under a detector perforation and accordingly the latching dog 42 will be drawn forwardly so that when the member 37 is depressed the latching dog will be interlocked with and held upwardly by the end of the rock member 34. At the beginning of the revolution the pin 46 will be drawn down by the action of stud 54 on the crank 53, and the rock member 34 will continue to hold the latching dog in its upper locked position as the roller 38 will be riding on the cam 39. During this operation the crank 28, on the opposite side of the machine, will swing rearwardly, but the spring 33 will be unable to draw the guide plate 22 forwardly because it is locked by the latching dog 42. As the rotation continues, the roller 38 will ride over the end of the cam 39 and permit the rock member 34 to again lock the crank.

The foregoing detailed description has been given for clearness of understanding only and no unnecessary limitations should be understood therefrom, but the appended claims should be construed as broadly as permissible, in view of the prior art.

I claim:

1. In an autographic register having a record compartment and a platen over which a strip of stationery provided with detector perforations may be fed from a zig-zag folded packet to said record compartment; guide-mechanism in said record compartment for guiding the strip back into zig-zag refolded condition; and detector-means for controlling the movement of said guide-mechanism by the perforations in said strip.

2. In an autographic register having a record compartment and a platen over which a strip of stationery provided with detector perforations may be fed from a zig-zag folded packet to said record compartment; feed-mechanism for advancing said strip over the platen to the record compartment; guide-mechanism in said record compartment for directing the refolding of the strip into a zig-zag folded record packet, said mechanism being driven by the feed-mechanism; and detector-means for controlling the movement of said guide-mechanism by the detector perforations in said strip.

3. A device as specified in claim 2, in which the detector-means comprises an upwardly extending finger normally held depressed by the stationery.

4. A device as specified in claim 2, in which the detector-means comprises an upwardly extending finger normally held depressed by the stationery and adapted when released by a detector perforation to lock the guide-mechanism, and means is provided for withdrawing said finger from a perforation after the guide-mechanism is locked.

5. In an autographic register having a record compartment and a platen over which a strip of stationery provided with detector perforations may be fed from a zig-zag folded packet to said record compartment; a drive shaft having a feed-wheel in said register for advancing said strip into the record compartment; a movable guide in said record compartment for directing the refolding of the strip into a zig-zag folded record packet; cam-mechanism driven by said drive shaft and adapted to move said guide during each revolution of the feed wheel; locking mechanism for holding the guide against substantial movement; and detector means for controlling the operation of said locking mechanism by the detector perforations in said strip.

6. A device as specified in claim 5, in which the guide is pivotally mounted in the upper part of the record compartment and is provided with an operating crank making a lost-motion connection with a crank oscillated by the cam-mechanism, so that the cam-mechanism may operate when the guide is locked against movement.

7. In an autographic register having a record compartment and a platen over which a strip of forms, provided in alternate forms with detector perforations, may be fed from a zig-zag folded supply packet to said record compartment; a drive shaft journalled in said casing and provided with a feed-wheel and an operating crank; a pivotally mounted guide plate having a driving connection with said drive shaft which is adapted to move said guide-plate during each rotation of the drive shaft; means for locking said plate against substantial movement; and a detector finger mechanism for controlling the operation of the locking means by the detector perforations in the forms.

8. A device as specified in claim 7, in which the locking means comprises a rock arm adapted to form a stop for the operating crank and support a latching dog which is adapted to hold the guide plate from movement.

9. A device as specified in claim 7, in which the locking means comprises a rock arm adapted to form a stop for the operating crank and support a latching dog which is adapted to hold the guide plate from movement, said arm being depressible to release the crank, a cam is provided on said crank for holding the arm depressed during the first portion of the crank rotation, and a cam is provided on the drive shaft for holding the arm depressed during a continuing portion of said crank rotation.

10. In an autographic register having a record compartment and a platen over which a strip of forms, provided in alternate forms with detector perforations, may be fed from a zig-zag folded supply packet to said record compartment; a drive shaft journalled in said casing and provided with a feed-wheel and an operating crank; a pivotally mounted guide plate having a driving connection with said drive shaft which is adapted to move said guide-plate during each rotation of the drive shaft; a latching dog adapted to hold the guide-plate against substantial movement; a rock-arm adapted to hold said dog in guide-holding position; and detector mechanism controlled by the stationery, for controlling operative engagement of the latching dog and rock-arm.

11. A device as specified in claim 10, in which the detector mechanism has a shaft having a crank-finger extending upwardly into the path of the detector perforations in the stationery and a crank arm, pivotally connected to a link, making a lost-motion connection with the latching dog.

12. A device as specified in claim 10, in which the detector mechanism has a shaft having a crank-finger extending upwardly into the path of the detector perforations in the stationery and a crank arm, pivotally connected to a link, making a lost-motion connection with the latching dog, said shaft being further provided with an arm adapted to be rocked by a stud carried by the main drive shaft so as to withdraw said crank-finger from a detector perforation when feeding of the stationery is resumed.

13. A device as specified in claim 10, in which spring means is provided for urging the latching dog out of operative engagement with the rock-arm.

14. A device as specified in claim 10, in which spring means is provided for urging the latching dog out of operative engagement with the rock-arm, and said latching dog is provided with an interlocking detent to prevent its disengagement with the rock-arm while holding the guide plate from movement.

15. A device as specified in claim 10, in which one end of the rock-arm forms a depressible stop for the operating crank, said crank having a cam for holding the stop depressed during the initial portion of its revolution.

16. A device as specified in claim 10, in which one end of the rock-arm forms a depressible stop for the operating crank, said crank having a cam for holding the stop depressed during the initial portion of its revolution, and the drive shaft is provided with cam-mechanism for holding the rock-arm depressed after said operating crank cam has released said stop.

ALLEN B. COOKE.